Patented Sept. 15, 1931

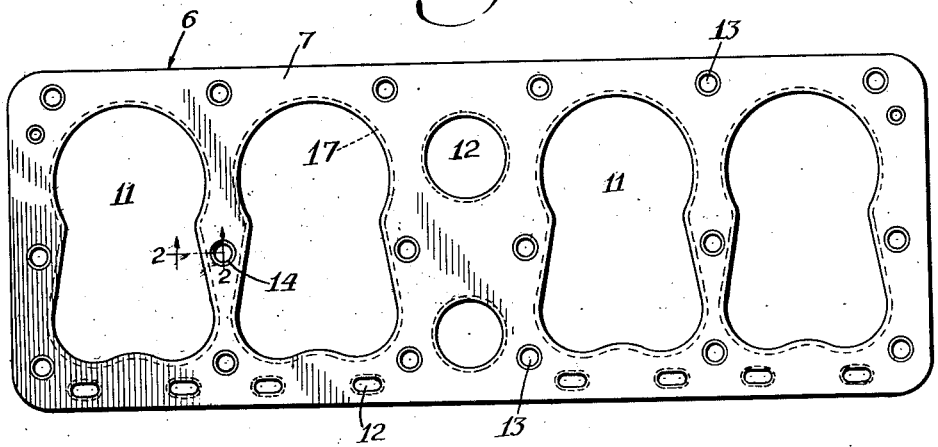
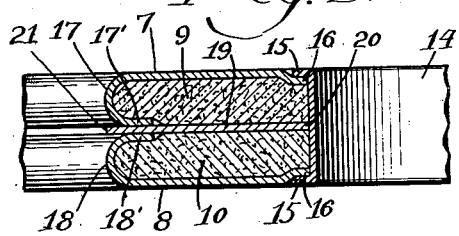
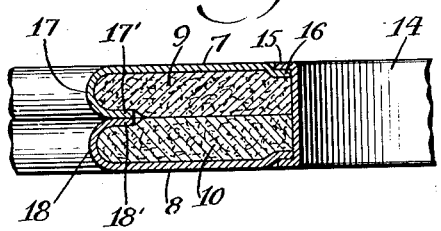
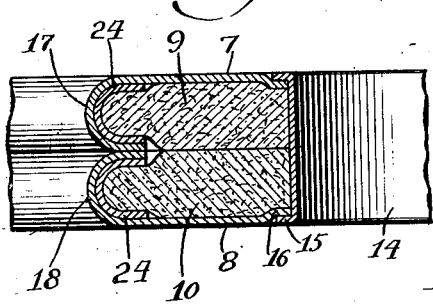
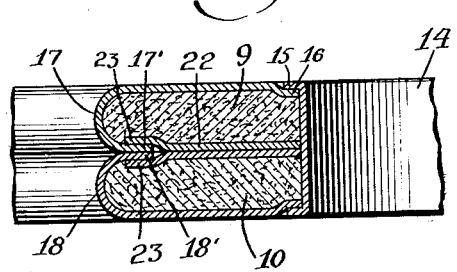
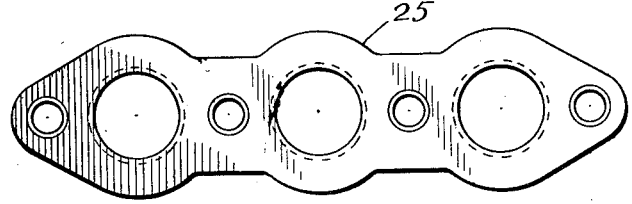

1,823,284

UNITED STATES PATENT OFFICE

FRANK J. OVEN, OF CHICAGO, ILLINOIS, ASSIGNOR TO VICTOR MANUFACTURING & GASKET COMPANY, OF CHICAGO, ILLINOIS, A CORPORATION OF ILLINOIS

GASKET

Application filed December 17, 1930. Serial No. 502,912.

This invention relates to gaskets and although particularly useful in cylinder head gaskets it can be embodied in manifold and other gaskets with correspondingly satisfactory results.

The object of this invention is to provide a thick gasket built up of layers of metal and gasket material with some or all of the openings protected by integral flanges formed on the metal layers without excessive drawing of the metal.

Another object of the invention is to provide novel flanges at the openings in a thick gasket formed of layers of metal and gasket material without unduly drawing the metal of the metal layers, and reenforcing these flanges in a novel manner to overcome the decrease in resistance caused by drawing the metal and to assist the flanges in resisting heat and pressure in actual use of the gasket.

Another object of the invention is to provide a thick gasket of novel and substantial construction which can be made economically, and to reenforce this gasket bodily in a simple and novel manner to resist distortion and to strengthen the gasket against conditions of use.

And a further object of the invention is to provide a thick gasket made up of laminations of layers of metal and gasket material with novel means which can be easily and economically applied for securing the layers together in compact form.

In the accompanying drawings I have shown the invention in embodiments selected for illustration and referring thereto Fig. 1 is a plan view of a thick gasket embodying the invention.

Fig. 2 is an enlarged sectional view on the line 2—2 of Fig. 1.

Figs. 3, 4 and 5 are sectional views similar to Fig. 2 but showing other constructions.

Fig. 6 is a plan view of a thick manifold gasket embodying the invention.

Referring to the drawings, the cylinder head gasket 6, Figs. 1—5, comprises outer metal layers 7, 8 and interposed layers 9, 10 of gasket material. The metal layers may be made of copper or other suitable metal and the layers of gasket material may be made of asbestos or asbestos composition or other suitable heat-resisting and elastic material. The gasket is provided with any number of combustion port openings 11, water port openings 12 and bolt openings 13. The layers are held together at some or all of the bolt openings by grommets 14 which line the bolt openings and have out-turned flanges 15 at the ends overlapping depressed marginal edges 16 of the metal layers 7, 8 so that the flanges 15 will lie flush with the outer surfaces of the gasket. The metal of the outer metal layers is drawn to form flanges 17, 18 about the combustion and water openings of the gasket, and these flanges are oppositely disposed and reversely bent about the adjacent edges of the layers of gasket material with the free marginal edges of the flanges in substantial parallelism. In Figs. 3, 4 and 5 the free edges 17', 18' of the flanges 17, 18 are arranged in abutting relation; in Fig. 2 these free edges are arranged in the same position but on opposite sides of an intermediate body reenforce preferably consisting of a flat metal layer 19 arranged between the layers of gasket material with edges 20 abutting the grommets and edges 21 projecting between the flanges 17, 18. I prefer to provide a plurality of layers of gasket material rather than a single layer of gasket material because I find it more economical to manufacture a thick gasket in this way, and the flanges 17, 18 may be formed to enclose edges of the layers of gasket material without unduly drawing the metal of the metal layers as would be necessary if the metal were drawn to form flanges for the full thickness of the gasket. Instead of using a single reenforce metal layer 19, Fig. 2, I may provide a reenforce 22, Fig. 5, composed of two metal layers arranged one upon the other in abutting relation to the grommets 14 and with their marginal edges 23 bent to enclose the marginal edges 17′, 18′ of the flanges 17, 18. And I may reenforce the flanges 17, 18 by metal ring insertions 24, Fig. 4, if desired. The invention enables a thick gasket to be manufactured in a simple and economical way by making it up in sections each comprising a layer of gasket material with an outer layer secured thereon by its flanges and, in the construction of Fig. 4, with the reenforce 24 embedded therein, and in the construction of Fig. 2 with one layer of the body reenforce embedded therein. These sections are then assembled, with the body reenforce in the construction of Fig. 5, one upon the other, and all the layers are securely united by applying the grommets 14. These grommets can be made of relatively thin and cheap material and they can be easily and quickly applied by familiar methods and means.

By the use of my invention a thick gasket for cylinder heads, manifolds and other uses can be made economically and of strong and substantial construction without drawing the metal of the metal layers excessively to form protection flanges and at the same time protecting the gasket about openings therein to resist heat and pressure in actual use. According to my invention the gasket is built up of a plurality of layers of metal and gasket material which enables the mechanical operations to be performed economically in the manufacture of the gasket with the desired protection and reenforcing insertions. And these layers are rigidly and securely held together in a unit forming the gasket. When the gasket is subjected to pressure in a joint the parts of the gasket will be more or less compressed to form a tight seal which will resist heat and pressure at the combustion openings and prevent the escape of water at the water circulation openings.

While I have shown and described the invention in especial relation to a cylinder head gasket, which is the important use for the invention, it is also adaptable for use in manifold gaskets 25, one type of which is shown in Fig. 6, and it may be used in other types of cylinder head and manifold gaskets and in other gaskets; and I reserve the right to make all such changes in the form, construction and arrangement of parts of the invention which may be necessary or desirable to satisfy different conditions in adapting the invention to different gaskets and within the scope of the following claims:

I claim:
1. A gasket having port openings therein and comprising two outer metal layers and two interposed layers of gasket material, the metal layers having integral inwardly directed flanges with the flanges of one metal layer reversely bent about the marginal edges of one layer of gasket material at said openings and with the flanges of the other metal layer reversely bent about the marginal edges of the other layer of gasket material at said openings, the free marginal edges of said flanges being disposed in substantial parallelism, and means securing all of said layers together.

2. A gasket having port openings and bolt openings therein and comprising two outer metal layers and two interposed layers of gasket material, the metal layers having integral flanges with the flanges of one metal layer reversely bent about the marginal edges of one layer of gasket material at the port openings and with the flanges of the other metal layer reversely bent about the marginal edges of the other layer of gasket material at the port openings, the free marginal edges of said flanges being disposed in substantial parallelism, and grommets extending through said bolt openings for securing all of said layers together.

3. A gasket having port openings therein and comprising two outer metal layers and two interposed layers of gasket material, the metal layers having integral inwardly directed flanges with the flanges of one metal layer reversely bent about the marginal edges of one layer of gasket material at said openings and with the flanges of the other metal layer reversely bent about the marginal edges of the other layer of gasket material at said openings, the free marginal edges of said flanges being disposed in substantial parallelism, a body reenforce arranged between said layers of gasket material, and means securing all of said layers and said reenforce together.

4. A gasket having port openings therein and comprising two outer metal layers and two interposed layers of gasket material, the metal layers having integral flanges with the flanges of one metal layer reversely bent about the marginal edges of one layer of gasket material and the flanges of the other metal layer reversely bent about the marginal edges of the other layer of gasket material at some of said openings, the free marginal edges of said flanges being disposed in substantial parallelism, a body reenforce comprising two metal layers interposed between said layers of gasket material and having edges thereof bent to enclose the free marginal edges of said flanges, and means securing all of said layers and said reinforce together.

5. A gasket having openings therein and comprising two outer metal layers and two interposed layers of gasket material, metal reenforces enclosing the marginal edges of said layers of gasket material at some of said openings, the metal layers having integral flanges with the flanges of one layer enclosing the reenforces of one layer of gasket material and the flanges on the other metal layer enclosing the reenforces of the other layer of gasket material, and means securing all of said layers together.

FRANK J. OVEN.